United States Patent
O'Connor et al.

(10) Patent No.: US 6,887,457 B2
(45) Date of Patent: May 3, 2005

(54) PROCESS FOR THE PREPARATION OF CATALYSTS COMPRISING A PENTASIL-TYPE ZEOLITE

(75) Inventors: Paul O'Connor, Hoevelaken (NL); Dennis Stamires, Newport Beach, CA (US)

(73) Assignee: Akzo Nobel N.V., Arnhem (NL)

( * ) Notice: Subject to any disclaimer, the term of this patent is extended or adjusted under 35 U.S.C. 154(b) by 18 days.

(21) Appl. No.: 10/647,853

(22) Filed: Aug. 25, 2003

(65) Prior Publication Data

US 2004/0092756 A1 May 13, 2004

Related U.S. Application Data

(60) Provisional application No. 60/406,445, filed on Aug. 28, 2002.

(51) Int. Cl.$^7$ ............................. C01B 39/36; B01J 29/40
(52) U.S. Cl. ............... 423/709; 423/716; 423/DIG. 22; 502/68; 502/71
(58) Field of Search .................. 423/709, 716, 423/DIG. 22, DIG. 23, DIG. 29, DIG. 33, DIG. 35, DIG. 36, DIG. 27; 502/68, 71

(56) References Cited

U.S. PATENT DOCUMENTS

| | | | |
|---|---|---|---|
| 3,308,069 A | 3/1967 | Wadlinger et al. ........... 252/455 |
| 3,702,886 A | 11/1972 | Argauer et al. .............. 423/328 |
| 3,709,979 A | 1/1973 | Chu ............................ 423/328 |
| 3,832,449 A | 8/1974 | Rosinski et al. ............. 423/328 |
| 3,941,871 A | 3/1976 | Dwyer et al. ................ 423/326 |
| 4,016,245 A | 4/1977 | Plank et al. ................. 423/328 |
| 4,299,808 A | 11/1981 | Klotz ........................ 423/331 |
| 4,329,328 A | 5/1982 | McAnespie et al. ........ 423/333 |
| 4,363,718 A | 12/1982 | Klotz ........................ 208/110 |
| 4,376,104 A | 3/1983 | Ball et al. ................... 423/329 |
| 4,405,502 A | 9/1983 | Klotz ........................ 252/455 |
| 4,430,314 A | 2/1984 | Audeh et al. ............... 423/326 |
| 4,560,542 A * | 12/1985 | Robson ...................... 423/703 |
| 4,606,901 A * | 8/1986 | Chu et al. ................... 423/716 |
| 4,654,511 A | 3/1987 | Horsma et al. ............. 219/548 |
| 4,732,747 A | 3/1988 | Garces ....................... 423/328 |
| 4,788,169 A | 11/1988 | Degman, Jr. et al. ......... 502/61 |
| 4,828,812 A | 5/1989 | McCullen et al. .......... 423/326 |
| 4,847,055 A * | 7/1989 | Chu ............................ 423/705 |
| 4,851,602 A | 7/1989 | Harandi et al. ............. 585/322 |
| 4,935,561 A | 6/1990 | Eichler et al. .............. 570/202 |
| 4,962,266 A | 10/1990 | Shum ......................... 585/660 |
| 4,968,650 A | 11/1990 | Chu et al. ..................... 502/61 |
| 5,013,537 A | 5/1991 | Patarin et al. .............. 423/328 |
| 5,064,793 A | 11/1991 | Occelli ......................... 502/61 |
| 5,100,636 A * | 3/1992 | Thome et al. .............. 423/170 |
| 5,137,706 A | 8/1992 | Annen et al. ............... 423/326 |
| 5,158,757 A | 10/1992 | Deloprato et al. .......... 423/709 |
| 5,240,892 A * | 8/1993 | Klocke ........................ 502/77 |
| 5,273,737 A | 12/1993 | Wallau et al. .............. 423/709 |
| 5,354,719 A | 10/1994 | Gabelica et al. ............ 502/62 |
| 5,363,002 A | 11/1994 | Hernden et al. ............ 310/54 |
| 5,409,685 A | 4/1995 | de Riese-Meyer et al. . 423/544 |
| 5,466,432 A | 11/1995 | Wallau et al. .............. 423/700 |
| 5,466,835 A | 11/1995 | Nemeth et al. ............. 549/531 |

FOREIGN PATENT DOCUMENTS

| | | | |
|---|---|---|---|
| EP | 0 156 595 | 10/1985 | .......... C01B/33/26 |
| EP | 194 101 | 9/1986 | .......... C10G/11/05 |
| EP | 201 264 | 12/1986 | .......... C01B/33/28 |
| EP | 1 264 635 | 12/2002 | ............ B01J/37/00 |
| WO | 00/44672 | 8/2000 | .............. C01F/7/00 |
| WO | 01/12570 | 2/2001 | .......... C04B/33/02 |
| WO | 02/064499 | 8/2002 | .......... C01B/13/36 |
| WO | 02/064504 | 8/2002 | ............. C01F/7/00 |

OTHER PUBLICATIONS

International Search Report of corresponding PCT/EP 03/09181 dated Feb. 2, 2004.
Japanese abstract 10194730, Dec. 30, 1996 (computer translation attached).
Chinese abstract 1084100, Sep. 9, 1992.
Chinese abstract 1084101, Sep. 9, 1992.
Abstract of E.F. Zharov et al., Vestn. Khar'kov Politekh. Inst. 3 (1966) 113–118.
Romania abstract 111743, Nov. 23, 1995.
European Search Report of corresponding Patent Application No. 02079412.9.

* cited by examiner

*Primary Examiner*—David Sample
(74) *Attorney, Agent, or Firm*—Louis A. Morris

(57) ABSTRACT

A process for the preparation of a composition comprising a pentasil-type zeolite, which process comprises the following steps:
a) hydrothermally treating an aqueous slurry comprising an aluminium source, a silicon source, a seeding material, and optionally a divalent metal source, thereby forming a pentasil-type zeolite and at least one other compound, and
b) shaping the product of step a). Examples of the at least one other compound are anionic clay, cationic clay, Si—Al cogel, and (pseudo)boehmite.

10 Claims, No Drawings

PROCESS FOR THE PREPARATION OF CATALYSTS COMPRISING A PENTASIL-TYPE ZEOLITE

CROSS REFERENCE TO RELATED APPLICATION

This application claims priority from patent application Ser. No. 60/406,445, filed Aug. 28, 2002.

BACKGROUND OF THE INVENTION

1. Field of the Invention

The present invention relates to a process for the preparation of catalyst compositions comprising a pentasil-type zeolite and at least one other catalyst component.

2. Prior Art

EP 0 156 595 discloses a process for the preparation of catalyst compositions comprising 60 wt % or less of a pentasil-type zeolite in a porous matrix by (i) mixing zeolite seeds, an aluminium source, and a silicon source in water to form a slurry, (ii) shaping the slurry to form discrete particles, (iii) mixing the particles with a source of alkali cations in an aqueous reaction mixture, and (iv) hydrothermally treating the particles to form the zeolite in the particles.

Hence, in the process of EP 0 156 595 a slurry is formed, the slurry is shaped, the shaped particles are slurried again and hydrothermally treated.

The process of the present invention, however, is more convenient for the preparation of catalyst compositions comprising a pentasil-type zeolite.

SUMMARY OF THE INVENTION

In one embodiment, the process of the present invention comprises the steps of:
a) hydrothermally treating an aqueous slurry comprising an aluminium source, a silicon source, a seeding material, and optionally a divalent metal source, thereby forming a pentasil-type zeolite and at least one other compound, and
b) shaping the product of step a).

Other embodiments of the invention relate to reaction mixture compositions and process steps.

DETAILED DESCRIPTION OF THE INVENTION

In contrast to the prior art process, the process according to the invention does not involve re-slurrying of shaped particles. The zeolite in the process according to the invention is not formed in situ, i.e. inside the shaped particles, but ex situ, i.e. before the formation of particles. Furthermore, this process offers a convenient way to make compositions of, for instance, ZSM-5 and boehmite, ZSM-5 and hydrotalcite, ZSM-5 and kaolin.

Aluminium sources which can suitably be used in the process according to the present invention include aluminium oxides and hydroxides such as transition alumina, aluminium trihydrate (BOC, gibbsite, bayerite) and its thermally treated forms (including flash-calcined aluminium trihydrate), alumina sol, alumina gel, amorphous alumina, and (pseudo)boehmite, aluminium chlorohydrol, aluminium nitrohydrol, alumina salts such as aluminium nitrate, aluminium chloride, aluminium chlorohydrate, sodium aluminate, aluminium phosphate, aluminium bearing clays including their calcined forms, and mixtures thereof.

Preferred aluminium sources are the aluminium oxides and hydroxides mentioned above, as these materials are relatively inexpensive. Moreover, these materials do not leave anions in the catalyst composition which either have to be washed out or will be emitted as environmentally harmful gases upon heating.

Suitable silicon sources include sodium silicate, sodium meta-silicate, stabilised silica sols, silica gels, polysilicic acid, tetra ethylortho silicate, fumed silicas, precipitated silicas, and mixtures thereof.

Preferably, a silica sol is used that does not introduce sodium into the catalyst composition, such as an ammonium silica sol.

Optionally, a divalent metal source is added in step (a). Suitable divalent metal sources include magnesium, zinc, nickel, copper, iron, cobalt, manganese, calcium, barium, and combinations thereof. A preferred divalent metal is magnesium.

Suitable zinc, nickel, copper, iron, cobalt, manganese, calcium, and barium sources are the respective oxides, hydroxides, carbonates, nitrates, chlorides, phosphates, titanates, and zirconates.

Suitable magnesium sources include magnesium oxides or hydroxides such as MgO, $Mg(OH)_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, and magnesium chloride, magnesium-containing clays such as dolomite, saponite, hectorite, laponite, sepiolite, and mixtures thereof.

Suitable seeding materials include seeds and templates, such as faujasite-type seeds (zeolite X or Y), pentasil-type seeds (e.g. ZSM-5 seeds), amorphous seeds (e.g. amorphous Si—Al cogel), clays (e.g. bentonite, kaolin), milled zeolites with crystallites too small to be detected by X-ray diffraction techniques, and sols or gels containing an organic directing template like tetrapropyl ammonium hydroxide (TPAOH) or tetrapropyl ammonium bromide (TPABr). An example of such a template-containing sol is a Si—Al sol containing 0.1–10 wt % of tetrapropyl ammonium bromide.

If desired, additives may be present during step (a). These additives can be added to the mixture separately. On the other hand, it is also possible to use an aluminium source, a silicon source, a seeding material and/or a divalent metal source that is doped with such additives.

The term "doped" means that the desired additive (also called dopant) has been incorporated into the silicon source, aluminium source, divalent metal source, or seeding material, before the above process is performed, e.g. by preparing these metal sources or the seeding material in the presence of the desired dopant.

Suitable dopants are compounds comprising an element selected from the group of rare earth metals (for example La and Ce), Si, P, B, Group VI metals, Group VIII noble metals, alkaline earth metals (for instance Ca and Ba) and/or transition metals (for example Mn, Fe, Nb, Zn, Cr, Ti, Zr, Cu, Ni, Zn, Mo, W, V, Sn). Suitable compounds are the oxides, hydroxides, carbonates, hydroxycarbonates, chlorides, nitrates, sulfates, and phosphates of the above elements.

During step a), acids and bases can be added to adjust the pH. The desired pH depends, e.g., on the type of other compound that is desired to be formed. For instance, if an anionic clay is the desired other compound, the slurry preferably has a pH above 6. If, on the other hand, boehmite is the desired other compound, the pH preferably is between about 4 and 8.

Generally used catalyst components can be added to the slurry before or during the hydrothermal treatment of step a).

This will result in shaped bodies comprising an intimate mixture of these catalytic compounds with the pentasil-type zeolite and the other compound. It is preferred not to add such catalyst components after completion of step a)—i.e. after completion of the hydrothermal treatment—and before shaping step b).

Examples of suitable catalyst components are metal traps, combustion promoters, zeolites other than pentasil-type zeolites, alumina-titania, titania, zirconia, clays, metal salts, and alkaline earth metal (hydr)oxides.

It should be noted that these "generally used catalyst components" that can be added to the slurry do not apply as the "other compound" according to step a) of claim 1. The "other compound" according to claim 1 is formed out of the aluminium source, the silicon source and/or the divalent metal source during the hydrothermal treatment and is not simply added to the slurry as such.

The slurry is treated hydrothermally. Hydrothermal means under aqueous conditions at a temperature above 100° C. and a pressure above atmospheric. Suitable temperatures for the process according to the present invention range from 100° to 300° C., preferably 100°–200° C. Most conveniently, autogeneous pressure is applied.

If desired, more than one hydrothermal treatment is used.

The aluminium source, the silicon source, and the optional divalent metal source react in the presence of a suitable seeding material to form a pentasil-type zeolite and at least one other compound.

If, apart from the seeding material, only a silicon and an aluminium source are used, an excess of aluminium source such as (thermally treated) aluminium trihydrate (e.g. flash-calcined aluminium trihydrate) will result in the formation of (pseudo)boehmite as the other compound.

If a divalent metal source and an excess of aluminium source are present, the other compound will be an anionic clay and optionally—depending on the amount of aluminium source, the divalent metal source, and the reaction conditions—an aluminium (hydr)oxide and/or a divalent metal (hydr)oxide. Various anionic clays can be formed, depending on the nature of the divalent metal. Typical examples are Mg—Al anionic clays, Zn—Al anionic clays, and Fe—Al anionic clays. It is noted that the term "anionic clay" is equivalent to the terms "hydrotalcite-like material" and "layered double hydroxide" frequently used in the prior art.

If a divalent metal source is used and the reaction conditions are such that the aluminium and silicon sources are not completely reacted to pentasil-type zeolite (e.g. by adjusting the Si—Al ratio, the amount of seed, and the reaction time), compositions comprising cationic clay can be formed. Examples of cationic clays are smectites (Al—Mg—Si clays) such as saponite and montmorillonite.

Compositions comprising zeolite and Si—Al cogel can be obtained by using a silicon source, an aluminium source, and a suitable seeding material, thereby controlling the Si—Al ratio, the amount of seeding material, and the reaction time to prevent complete conversion of the silicon and aluminium sources to zeolite.

The hydrothermal treatment can be conducted in one or more stages. If performed in one stage, the aluminium source, the silicon source, the seeding material, and the optional divalent metal source, additive, and other catalyst components are all added to the reactor before starting the hydrothermal treatment. If performed in two stages, one or more of the components are added during the hydrothermal treatment or in between two hydrothermal treatments. As an example of a two-stage process, a slurry comprising the aluminium source, the silicon source, and the seeding material are hydrothermally treated for a certain period of time in the first stage, thereby reacting at least partly to a pentasil-type zeolite. Next, a divalent metal source is added and the hydrothermal treatment is continued for an additional period of time, thereby forming an anionic clay and—if not already completed—completing the reaction to the pentasil-type zeolite.

The hydrothermal treatment can be conducted in one or a series of at least two reaction vessels. Preferably, this is done in a continuous process. If more than one reaction vessel is used, the aluminium source, the silicon source, the seeding material, and the optional divalent metal source, additive, and other catalyst components can all be added to the first vessel, but the addition of these sources can also be divided over the available reaction vessels. For instance, the aluminium source and the silicon source can be mixed in the first reaction vessel to form a Si—Al cogel, the cogel and the zeolite seeds are introduced into a second reaction vessel and reacted at least partly to a pentasil-type zeolite, and the zeolite-containing slurry and a divalent metal source are finally introduced into a third reaction vessel wherein any excess of aluminium source is reacted with the divalent metal source to obtain an anionic clay.

It is also possible to mix and hydrothermally treat the aluminium source, the silicon source, and the seeds in the first reaction vessel, thereby forming at least a part of the total amount of zeolite, and add additional aluminium source (e.g. aluminium trihydrate or flash-calcined aluminium trihydrate) to this mixture in the second conversion vessel. Hydrothermal treatment of the resulting mixture will lead to the formation of a composition comprising pentasil-type zeolite and (pseudo)boehmite.

The product formed during hydrothermal treatment is shaped. Suitable shaping methods include spray-drying, pelletising, extrusion (optionally combined with kneading), beading, or any other conventional shaping method used in the catalyst and absorbent fields or combinations thereof. The amount of liquid present in the suspension used for shaping should be adapted to the specific shaping step to be conducted. It may be advisable to partially remove the liquid used in the suspension and/or add an additional or another liquid, and/or to change the pH of the precursor mixture to make the suspension gellable and thus suitable for shaping. Additives commonly used in the different shaping methods, e.g. extrusion additives, may be added to the precursor mixture used for shaping.

The pentasil-type zeolite obtained during the present process preferably is a ZSM-type material, more preferably ZSM-5, ZSM-11, ZSM-12, ZSM-22, ZSM-23, ZSM-35, zeolite beta, or zeolite boron beta, which are described in U.S. Pat. Nos. 3,308,069; 3,702,886; 3,709,979; 3,832,449; 4,016,245; 4,788,169; 3,941,871; 5,013,537; 4,851,602; 4,564,511; 5,137,706; 4,962,266; 4,329,328; 5,354,719; 5,365,002; 5,064,793; 5,409,685; 5,466,432; 4,968,650; 5,158,757; 5,273,737; 4,935,561; 4,299,808; 4,405,502; 4,363,718; 4,732,747; 4,828,812; 5,466,835; 5,374,747; 5,354,875.

Examples of compositions that can be obtained with the process according to the invention are: a composition comprising ZSM-5 and a Si—Al cogel, zeolite beta and Si—Al cogel, ZSM-5 and a Mg—Al anionic clay, zeolite beta and Mg—Al anionic clay, ZSM-5 and (pseudo)boehmite, zeolite beta and (pseudo)boehmite, ZSM-5, Mg—Al anionic clay and (pseudo)boehmite, zeolite beta, Mg—Al anionic clay and (pseudo)boehmite, ZSM-5 and smectite, zeolite beta and smectite, etc.

The above compositions may contain one or more additives, such as a phosphorus compound, or metal compounds. Preferred metals include Ce, La, Mn, Fe, Nb, Zn, Cr, Ti, Zr, Cu, Ni, Zn, Mo, W, V, Sn, Pt, and Pd.

The composition preferably contains 5–95 wt % of pentasil-type zeolite, more preferably 20–80 wt % of pentasil-type zeolite, even more preferably 40–80 wt % of pentasil-type zeolite.

The catalyst compositions resulting from the process according to the invention may optionally be hydrothermally treated (e.g. in order to stabilise the zeolite), calcined and/or ion-exchanged with, for instance, rare-earth metals. The catalyst compositions resulting from the process according to the invention can be calcined at temperatures between 200 and 1,000° C., preferably 300–500° C. If an anionic clay is present in the catalyst composition, calcination will transform the anionic clay into a solid solution and optionally a spinel phase. The solid solution can be transformed into an anionic clay again by rehydrating the calcined composition in an aqueous slurry. If so desired, this aqueous slurry may contain dissolved additives, e.g. salts of metals such as Ce, La, Mn, Fe, Nb, Zn, Cr, Ti, Zr, Cu, Ni, Zn, Mo, W, V, Sn, Pt, and Pd.

The resulting catalyst compositions can suitably be used as catalyst or additive in FCC processes. The compositions according to the invention are suitable for the removal of $SO_x$ and/or $NO_x$ from flue gasses, reduction of the amount of sulfur and nitrogen in fuels such as gasoline and diesel, metal trapping, increasing the olefin content and reducing of the aromatics content of gasoline and light cycle oil, etc.

When used in FCC processes, compositions comprising pentasil-type zeolite (e.g. ZSM-5, ZSM-11, zeolite beta) and anionic clay (e.g. Mg—Al anionic clay) can lead to a product having a reduced yield of aromatics and an increased olefinicity.

EXAMPLES

Example 1

A 4.6 wt % aluminium sulfate solution (2,792 g) and a 30.3 wt % $H_2SO_4$ solution (441 g) were added to a stirred 30-liter autoclave. To this solution, 2,467 g of water glass were slowly added in 15 minutes. A gel was formed during the addition.

A seeding slurry (300 g, 14.1 w % solids) was prepared by mixing a commercial ZSM-5 and water. The slurry was milled until the ZSM-5 had an average particle size of 0.89 μm. This seeding slurry was slowly added to the aluminium sulfate/water glass mixture under vehement stirring for 10 minutes. The resulting slurry was hydrothermally treated at 170° C. for 4 hours.

Then, 1,500 g of a boehmite/MgO slurry with 12 wt % solids—prepared by mixing 95.7 g Catapal™ (Sasol, 73 wt % soldis), 112.4 g MgO (Nedgem, 98 wt % solids), and 1,291.9 g water—were pumped into the autoclave in 10 minutes. The resulting mixture was heated at 170° C. for an additional hour and finally spray-dried.

The PXRD pattern of the spray-dried product showed the presence of ZSM-5 and hydrotalcite.

Example 2

A 4.6 wt % aluminium sulfate solution (2792 g) and a 30.3 wt % $H_2SO_4$ solution (441 g) were added to a stirred 30-liter autoclave. To this solution, 2,467 g of water glass were slowly added in 15 minutes. A gel was formed during the addition.

A seeding slurry (300 g, 14.1 w % solids) was prepared by mixing a commercial ZSM-5 and water. The slurry was milled until the ZSM-5 had an average particle size of 0.89 μm. This seeding slurry was slowly added to the aluminium sulfate/water glass mixture under vehement stirring for 10 minutes. The resulting slurry was hydrothermally treated at 170° C. for 4 hours.

Then, 1,500 g of an aqueous slurry (12 wt % solids) of flash-calcined aluminium gibbsite (Alcoa CP-3®) were pumped into the autoclave in 10 minutes. The resulting mixture was heated at 170° C. for an additional hour and finally spray-dried.

The PXRD pattern of the spray-dried product showed the presence of ZSM-5 and boehmite.

What is claimed is:

1. A process for the preparation of a composition comprising a pentasil-type zeolite, which process comprises the steps of:

a) hydrothermally treating an aqueous slurry comprising an aluminium source, a silicon source, a seeding material, and optionally a divalent metal source, thereby forming a pentasil-type zeolite and at least one other compound selected from the group consisting of anionic clay, cationic clay, Si—Al cogel, and (pseudo) boehmite, and b) shaping the product of step a).

2. The process of claim 1 wherein the pentasil-type zeolite is a ZSM-type zeolite or zeolite beta.

3. The process of claim 1 wherein a doped seed is used as the seeding material in step a).

4. The process of claim 1 wherein step a) comprises mixing of an aluminium source, a silicon source, a seeding material, and a divalent metal source in a slurry, and wherein the divalent metal source is a magnesium source.

5. The process of claim 1 wherein the magnesium source is selected from the group consisting of MgO, $Mg(OH)_2$, hydromagnesite, magnesium carbonate, magnesium hydroxycarbonate, Mg-acetate, Mg-hydroxy-acetate, and mixtures thereof.

6. The process of claim 1 wherein the aluminium source is selected from the group consisting of aluminium trihydrate, flash-calcined aluminium trihydrate, boehmite, pseudoboehmite, aluminium sol, amorphous alumina, gel alumina, transition alumina, and mixtures thereof.

7. The process of claim 1 wherein the silicon source is sodium (meta) silicate, silica sol, or a mixture thereof.

8. The process of claim 1 wherein step a) is performed continuously in a series of at least two reaction vessels.

9. The process of claim 1 wherein step a) comprises mixing of an aluminium source, a silicon source, a seeding material, and a divalent metal source in a slurry, thereby forming a pentasil-type zeolite and an anionic or cationic clay as the other compound.

10. The process of claim 1 wherein step a) comprises mixing of a silicon source, an excess of aluminium source, and a seeding material, thereby forming a pentasil-type zeolite and (pseudo)boehmite as the other compound.

* * * * *